United States Patent
Mullis

(10) Patent No.: US 10,082,436 B2
(45) Date of Patent: Sep. 25, 2018

(54) METHOD FOR PROCESSING A MEASUREMENT SIGNAL FROM A PRESSURE MEASUREMENT CELL, AND A MEASUREMENT CELL ARRANGEMENT

(71) Applicant: INFICON GMBH, Bad Ragaz (CH)

(72) Inventor: Felix Mullis, Flums (CH)

(73) Assignee: INFICON GMBH, Bad Ragaz (CH)

( * ) Notice: Subject to any disclaimer, the term of this patent is extended or adjusted under 35 U.S.C. 154(b) by 134 days.

(21) Appl. No.: 15/036,382

(22) PCT Filed: Nov. 14, 2013

(86) PCT No.: PCT/EP2013/073775
§ 371 (c)(1),
(2) Date: Jul. 6, 2016

(87) PCT Pub. No.: WO2015/070906
PCT Pub. Date: May 21, 2015

(65) Prior Publication Data
US 2016/0341618 A1 Nov. 24, 2016

(51) Int. Cl.
*G01L 9/00* (2006.01)
*G01L 23/08* (2006.01)
*H03H 21/00* (2006.01)

(52) U.S. Cl.
CPC ............ *G01L 9/0072* (2013.01); *G01L 23/08* (2013.01)

(58) Field of Classification Search
CPC ......... G01L 9/00; G01L 9/0072; G01L 23/00; G01L 23/08; H03H 21/00
See application file for complete search history.

(56) References Cited

U.S. PATENT DOCUMENTS

| | | | | |
|---|---|---|---|---|
| 5,007,007 A | * | 4/1991 | van Zanten | H03H 21/00 701/71 |
| 2009/0153337 A1 | * | 6/2009 | Cordesses | F02D 35/023 340/632 |

FOREIGN PATENT DOCUMENTS

| | | |
|---|---|---|
| EP | 0612149 A1 | 8/1994 |
| JP | 2010-101296 | 5/2010 |

OTHER PUBLICATIONS

International Preliminary Report on Patentability for PCT/EP2015/060263 dated Nov. 23, 2017, 17 pages. English translation provided.
(Continued)

*Primary Examiner* — Nguyen Ha
(74) *Attorney, Agent, or Firm* — Procopio, Cory, Hargreaves & Savitch LLP

(57) ABSTRACT

Method for processing a measurement signal (x) from a pressure measurement cell in order to generate an output signal (y) with the aid of a filter unit (10), wherein the method involves generating the output signal (y) with the aid of the filter unit (10) by at least reducing, preferably eliminating, a noise signal contained in the measurement signal (x), continuously determining a difference between the measurement signal (x) and the output signal (y), and changing a characteristic of the filter unit (10) as soon as the difference becomes greater than a threshold value, wherein the changed characteristic of the filter unit (10) remains as long as the difference becomes smaller than the threshold value, and wherein the changing of the filter characteristic involves decreasing the reduction in the noise signal present in the measurement signal (x).

14 Claims, 2 Drawing Sheets

(56) References Cited

OTHER PUBLICATIONS

International Search Report and Written Opinion for PCT App No. PCT/EP2013/073775 dated Sep. 11, 2014, 17 pgs.
Chen, M-H. et al., Residual Analysis for Feature Detection, IEEE Transactions on Pattern Analysis and Machine Intelligence, Jan. 13, 1991, No. 1, New York, pp. 30-40.
Drugman, T. et al., Glottal Closure and Opening Instant Detection from Speech Signals, Proceedings Interspeech Conference, Sep. 30, 2009, Brighton, UK, pp. 2891-2894.

\* cited by examiner

METHOD FOR PROCESSING A MEASUREMENT SIGNAL FROM A PRESSURE MEASUREMENT CELL, AND A MEASUREMENT CELL ARRANGEMENT

This application claims priority from PCT Application No PCT/EP2013/073775, filed Nov. 14, 2013.

The present invention relates to a method for processing a measurement signal from a pressure measurement cell and a measurement cell arrangement with a pressure measurement cell.

It is known to measure pressures or pressure differences in such a way that a thin membrane is subjected to pressure and the deflection resulting therefrom is measured. A known and suitable method to measure the deflection of such membranes consists of forming the membrane arrangement as a variable electrical capacitance, wherein the change in the capacitance, which correlates with the change in pressure, is evaluated via an electronic measuring system. The capacitance is formed in that the thin, flexible membrane surface is arranged at a small distance from a further surface of a body and both mutually opposite surfaces are formed to be electrically conductive. If the membrane and the body consist of non-conductive dielectric material, the surfaces are coated with an electrical coating for example, so that capacitor electrodes are formed. The membrane and/or the body can also be formed themselves of electrically conductive material, wherein in this case the surfaces form the capacitor electrodes. If pressure is applied to the membrane, the distance between the two electrodes changes as a result of deflection, which leads to a change in capacitance that can be evaluated. Sensors of this kind are produced in large numbers from silicon for example. Both the flat base body and also the membrane often completely consist of silicon. There are other embodiments with combined composition of materials, e.g. silicon with a glass base. The sensors can thus be produced at low cost. Pressure sensors of this type can mostly only be used for higher pressure ranges in the range of approximately $10^{-1}$ mbar to a few bars. A high resolution at low pressures from approximately $10^{-1}$ mbar can no longer be realised with the material silicon. Sensors of this kind are not suitable for typical vacuum applications. For measurements of the pressure in vacuum, measurements are often carried out between atmospheric pressure and $10^{-6}$ mbar for the various vacuum processes to be checked. Such measurements require high sensitivity with high resolution and good reproducibility of the vacuum pressure measurement, which can only be provided by especially formed measuring cells which completely deviate from the design of the high-pressure measuring cell.

Capacitive membrane pressure measuring cells which are made of corrosion-proof materials such as $Al_2O_3$ are especially suitable for vacuum pressure measurement. A known capacitive vacuum measuring cell, which is substantially completely made of ceramics and is corrosion-proof to a very high extent, is described in EP 1 070 239 B1. In order to enable the measurement of very low pressures up to $10^{-6}$ mbar with high precision, a very thin ceramic membrane of a thickness of 60 μm is used for example, which is arranged in a tension-free and symmetric manner in a ceramic housing.

The distance of the capacitor electrodes or the membrane surfaces from the surface of the housing body preferably lies in the range of 2 to 50 μm. The diameters of such membrane pressure measuring cells preferably lie in the range of 5 to 80 mm. The thus formed capacitances to be measured lie in the range of 10 pF to 32 pF. The measured capacitance is used as a measure for the pressure to be measured. This capacitance changes accordingly under a pressure-dependent deflection of the membrane, by means of which the pressure applied to the membrane can be detected. This measurement of the capacitance must occur in a very precise way and is not easy to carry out in the case of very low capacitance values because the low capacitances lead to the consequence that the changes in capacitance caused by the changes in the pressure are extremely small. As a result, the electrical signals generated or derived therefrom are exceptionally low and thus susceptible to disturbances.

Respectively high demands are thus placed on the signal processing systems for processing pressure signals according to the explanations made above. Furthermore, filter algorithms are used for optimising the properties of the measured pressure signals for further use, e.g. for controlling the pressure in process chambers. It is attempted to provide a filter algorithm which simultaneously achieves two principally contradictory objectives for processing pressure signals. Firstly, a transient response after a step-like change in the measurement signal should be completed as rapidly as possible, i.e. the output signal of the filter should lead as quickly as possible to a stable output signal. As a result, an optionally necessary action due to a change in pressure can be initiated as rapidly as possible. Secondly, a potential noise signal shall be suppressed as strongly as possible by the filter algorithm. As a result, a filter that is as quick as possible is demanded according to the first condition, whereas according to the second condition a rather slow filter is desirable.

Numerous efforts are known to provide a filter algorithm and thus a transmission function for a filter for processing the measurement signal in order to achieve the two contradictory objectives. The known filter algorithms are based on compromises, which in the present application do not lead to satisfactory results in the pressure measurement with highly sensitive sensors.

U.S. Pat. No. 5,838,599 describes a variant for a filter, which permits both short transient responses during a rapid change of the input signal and also a good reduction in the noise signal components in the input signal in the steady state.

It is therefore the object of the present invention to provide a method for processing a measurement signal in which a distinct suppression of the noise signal is achieved, but simultaneously allows a rapid reaction to relevantly changing measurement signals.

This object is achieved by the features of claim 1.

Advantageous embodiments and a measurement cell arrangement with a pressure measurement cell are provided in the further claims.

The method in accordance with the invention for processing a measurement signal from a pressure measurement cell in order to generate an output signal with the aid of a filter unit provides that the output signal is generated by means of a filter unit in that a noise signal contained in the measurement signal is at least reduced, preferably eliminated, a difference between the measurement signal and the output signal is determined continuously, and a characteristic of the filter unit is changed as soon as the difference becomes greater than a threshold value, wherein the changed characteristic of the filter unit remains until the difference becomes smaller than the threshold value, wherein the change in the filter characteristic involves decreasing the reduction in the noise signal present in the measurement signal.

An embodiment of the method in accordance with the invention is that the change in the filter characteristic consists of the measurement signal becoming the output signal in an unchanged manner.

Further embodiments of the method in accordance with the invention are that the measurement signal is converted with an analog-to-digital converter into a time-discrete measurement signal $X_n$, and the filter unit has a low-pass characteristic for reducing the noise signal, which characteristic is defined in a first approximation by a low-pass filter of the first order with a time constant $$\tau = \Delta T \cdot \frac{1-\alpha}{\alpha},$$

wherein $\Delta T$ corresponds to the scanning interval in a time-discrete system and $\alpha$ is a variable whose value lies between 0.0 and 0.1, preferably between 0.0 and 0.01, for a reduction of the noise signal in the measurement signal and the value of the variable $\alpha$ lies between 0.3 and 1.0 for the changed characteristic of the filter unit.

Further embodiments of the method in accordance with the invention are that for reducing the noise signal in the measurement signal $X_n$ the output signal $y_n$ is determined according to the formula $$y_n = \alpha \cdot x_n + (1-\alpha) \cdot y_{n-1},$$

wherein y is the time-discrete output signal, x is the time-discrete measurement signal and n a time-dependent index.

Further embodiments of the method in accordance with the invention consist of the variable $\alpha$ obtaining the value 1.0 if the difference between the measurement signal and the output signal is greater than threshold value.

Further embodiments of the method in accordance with the invention consist of the threshold value being determined in advance depending on the used pressure measurement cell and the threshold value remains fixed during operation of the pressure measurement cell.

Further embodiments of the method in accordance with the invention consist of a level of the noise signal being determined and the threshold value being determined depending on the level of the noise signal.

Further embodiments of the method in accordance with the invention consist of a median filter being applied to the measurement signal before it is processed in the filter unit, wherein the median filter preferably has a window width of three values.

The present invention further relates to a measurement cell arrangement with a membrane pressure measurement cell which generates a pressure-dependent measurement signal which is supplied to a filter unit for generating an output signal. The measurement cell arrangement in accordance with the invention is characterized in that means are present for the continuous formation of a difference between the measurement signal and the output signal, and means are present for changing an original characteristic of the filter unit, wherein the changed characteristic of the filter unit remains for as long as the difference is greater than a threshold value, wherein the changed filter characteristic reduces a noise signal present in the measurement signal to a lower extent than the original filter characteristic.

An embodiment of the measurement cell arrangement in accordance with the invention consists of the output signal corresponding to the measurement signal when the filter characteristic is changed.

Further embodiments of the measurement cell arrangement in accordance with the invention are that the measurement signal is supplied to an analog-to-digital converter for generating a time-discrete measurement signal $x_n$, and the filter unit has a low-pass characteristic for reducing the noise signal, which characteristic is defined in a first approximation by a low-pass filter of the first order with a time constant $$\tau = \Delta T \cdot \frac{1-\alpha}{\alpha},$$

wherein $\Delta T$ corresponds to the scanning interval in a time-discrete system and $\alpha$ is a variable whose value lies between 0.0 and 0.1, preferably between 0.0 and 0.01, for a reduction of the noise signal in the measurement signal and the value of the variable $\alpha$ lies between 0.3 and 1.0 for the changed characteristic of the filter unit.

Further embodiments of the method in accordance with the invention are that for reducing the noise signal in the measurement signal $x_n$ the output signal $y_n$ is determined according to the formula $$y_n = \alpha \cdot x_n + (1-\alpha) \cdot y_{n-1},$$

wherein y is the time-discrete output signal, x is the time-discrete measurement signal and n a time-dependent index.

Further embodiments of the method in accordance with the invention consist of the variable $\alpha$ obtaining the value 1.0 if the difference between the measurement signal and the output signal is greater than threshold value.

Even further embodiments of the method in accordance with the invention consist of the threshold value being determined in advance depending on the used pressure measurement cell and remaining fixed during operation of the pressure measurement cell.

Further embodiments of the method in accordance with the invention are that means are present for determining a level of the noise signal and the threshold value can be determined depending on the level of the noise signal.

Further embodiments of the method in accordance with the invention consist of a median filter being provided to which the measurement signal can be applied, wherein the median filter is operatively connected to the filter unit, and wherein the median filter preferably has a window width of three values.

Notice must be taken that the aforementioned embodiments can be combined in any desired manner. Only combinations of embodiments are excluded which can lead to contradiction as a result of the combination.

Embodiments of the present invention will be explained below in closer detail by reference to the drawings, wherein.

Figure 1:
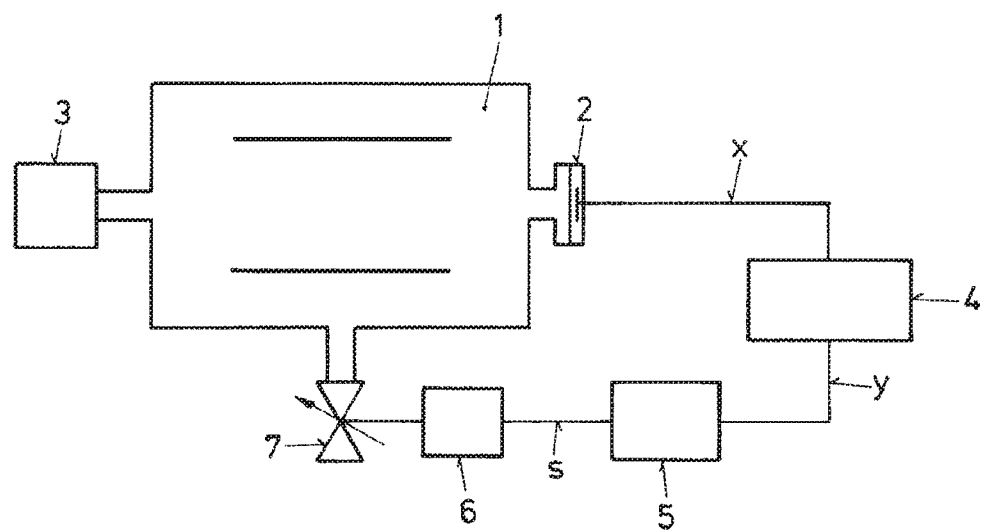
FIG. 1 shows a measurement cell arrangement with a membrane pressure measurement cell connected to a process chamber, with which a measurement signal is determined which is supplied to a valve after processing in accordance with the invention.

FIG. 1 shows a highly simplified block diagram of a measurement cell arrangement, comprising a process chamber 1, a membrane pressure measurement cell 2, a vacuum pump 3, a signal processing unit 4, a control unit 5, a valve actuator 6 and a valve 7. The membrane pressure measurement cell 2 is used for determining the pressure in the process chamber 1, in that a pressure predetermined according to a target value of a vacuum process is set. Vacuum processes comprise a large variety of processes such as coating processes, etching processes, thermal treatment of workpieces etc. Vacuum processes are often also operated with supporting gases, which are required both actively as a reactive gas and also as an inert gas in the process. The gases are supplied for this purpose to the process chamber 1 via the valve 7 actuated by the valve actuator 6, with which the gas feed and the pressure in the process chamber 1 can be controlled. A measurement signal x is generated by the membrane pressure measurement cell 2, which measurement signal is processed in the signal processing unit 4 and the control unit 5 into a control signal s for the valve actuator 6. It is necessary for precise process management that the membrane pressure measurement cell 2 measures as precisely as possible on the one hand but also rapidly on the other hand in order to enable the quickest and most precise possible reaction to changes in pressure in the process chamber 1.

The invention now relates to the processing of the measurement signal x in the context of the conditions present in a vacuum process and it aims to especially achieve optimal signal processing of the measurement signal x, as can occur in such vacuum processes as a pressure signal. Signal processing in the signal processing unit 4 can principally occur in an analog or digital manner, wherein no further reference is made below to special precautions to be taken when signal processing is carried out in an analog or digital fashion because such precautions (analog-to-digital conversion, filtering for preventing aliasing, selection of the scanning frequency etc) are adequately known to the person skilled in the art.

The output signal y of the signal processing unit 4 is further processed in the control unit 5 with a so-called P, PI or PID controller. The controller realised in the control unit 5 is especially responsible for the optimal readjustment of the control signal s for the valve actuator 6 or for the valve 7.

Figure 2:
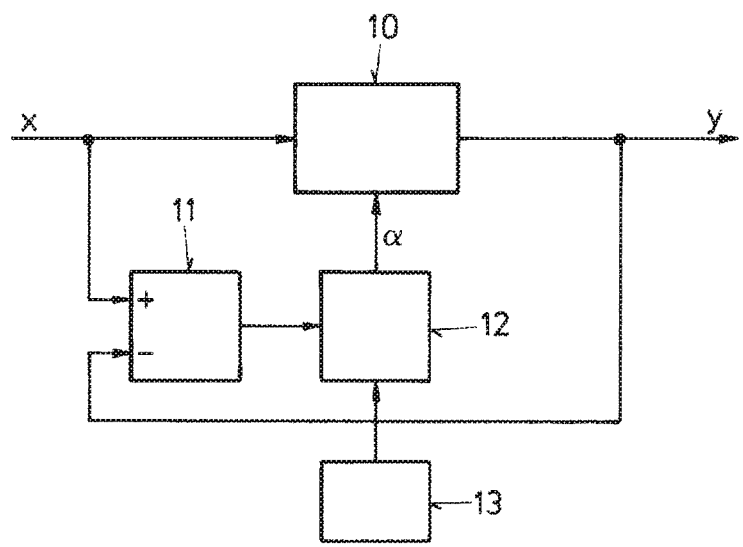
FIG. 2 shows a block diagram of a first embodiment of a filter unit in accordance with the invention for processing the measurement signal according to FIG. 1.

FIG. 2 schematically shows a simplified block diagram for illustrating the process steps, which are carried out in the signal processing unit 4 (FIG. 1) according to the present invention. For the purpose of realising the individual processing steps of the algorithm in accordance with the invention, a signal processor is used for example which is programmed respectively. It is obvious that the signal processor could also fulfil other tasks if the processor capacity is sufficient for this purpose. It can be considered in particular that the controller of the control unit 5 is realised in the same signal processor.

As is shown in FIG. 2, the measurement signal x is supplied to a filter unit 10 which generates the output signal y. The filter unit 10 with the measurement signal x and the output signal y form the actual signal path of the signal processing unit 4 (FIG. 1). The other components still to be explained such as the comparator unit 11, decision unit 12 and threshold value 13 are provided for determining the characteristics of the filter unit 10.

The filter unit 10 has a filter characteristic which is defined in a time-discrete system according to the following differential equation for example:

$$y_n = \alpha \cdot x_n + (1-\alpha) \cdot y_{n-1},$$

In this case, y is the time-discrete output signal, x is the time-discrete measurement signal, n is a time-dependent index and α is a variable whose value lies between 0.0 and 0.1, preferably between 0.0 and 0.01, for a reduction of the noise signal in the measurement signal x on the one hand (which is also designated below as α1), and between 0.3 and 1.0 for a changed characteristic (which is also designated below as α2). In the case of a specific embodiment, the value for α2 is equal 1.0 for the changed characteristic. Accordingly, the characteristic of the filter in the filter unit 10 is changed by a change in the variable α, namely in one embodiment in such a way that the variable α can contain either the value α1 or the value α2, wherein the values of α1 and α2 lie within the ranges as mentioned above.

The criterion for the filter changeover is produced by means of the comparator unit 11 and the decision unit 12. The measurement signal x is thus compared with the output signal y in the comparator unit 11 in that the difference is determined between the measurement signal x and the output signal y. In time-discrete systems, the difference is determined between the current measurement signal and the last output signal of the filter unit 10. The value of the variable α is determined in the decision unit 12 on the basis of the difference thus determined. For example, the decision unit 12 can comprise a comparator which compares the difference with a threshold value 13 which is predetermined and is a measure for a noise signal present in the measurement signal x. The filter characteristic of the filter unit 10 can thus be set in such a way that the noise signal in the measurement signal x is suppressed or even eliminated as long as the amplitude of the differential signal is lower than the threshold value 13. In view of the aforementioned differential equation and a value α1 for the variable α, the filter characteristic for suppressing the noise signal component has a low-pass characteristic, wherein the time constant for a filter of the first order can be determined as follows:

$$\tau_1 = \Delta T \cdot \frac{1-\alpha_1}{\alpha_1},$$

wherein α1 lies in the range of between 0.0 and 0.1, preferably between 0.0 and 0.01. As a result, a noise signal that is optionally present in the measurement signal x is suppressed to the highest possible extent and the filtered output signal y is exceptionally suitable for use in the downstream controller of the control unit 5, because a stable output signal leads to a lower activity of the valve actuator 6 or the valve 7 and thus to a reduced loading of these components, so that their failure probability is reduced to a considerable extent in comparison with known systems.

In order to ensure that the filter unit 10 and thus the entire measurement cell arrangement according to FIG. 1 can react rapidly to changing measurement signals x if its amplitude changes over the magnitude specified by the threshold value 13, the filter characteristic of the filter unit 10 is changed once the difference between the measurement signal x and the output signal y is greater than the threshold value 13. The change in the filter characteristic occurs by the change in the variable α, which assumes the value α2, wherein α2 lies in the range between 0.3 and 1.0, especially equal to 1.0. The time constant $\tau_2$ of the low-pass filter of the first order valid in the filter unit 10 is reduced considerably, which can be estimated easily from the following equation:

$$\tau_2 = \Delta T \cdot \frac{1-\alpha_2}{\alpha_2},$$

In the case of the specific embodiment of the present invention with a value of α2 equal 1.0, the filter function is practically switched off and the output signal y is identical to the measurement signal x. In this case, the changes in the measurement signal x are considered in a delay-free manner in the measurement cell arrangement, thus fulfilling the condition of a rapid system response. Once the difference between the measurement signal x and the output signal y is less than the threshold value 13, a change in the filter characteristic of the filter unit 10 occurs again: the original state is produced again in that the variable α receives the value α1 again, so that a potential noise signal in the measurement signal x can be suppressed or eliminated again.

It is provided in a further embodiment of the present invention that the values α1 and α2 do not concern constant values but that the values are continuously adjusted within the stated value ranges, wherein the adjustment of the values α1 and α2 occurs as a function in the magnitude of the difference between the measurement signal x and the output signal y.

Figure 3:
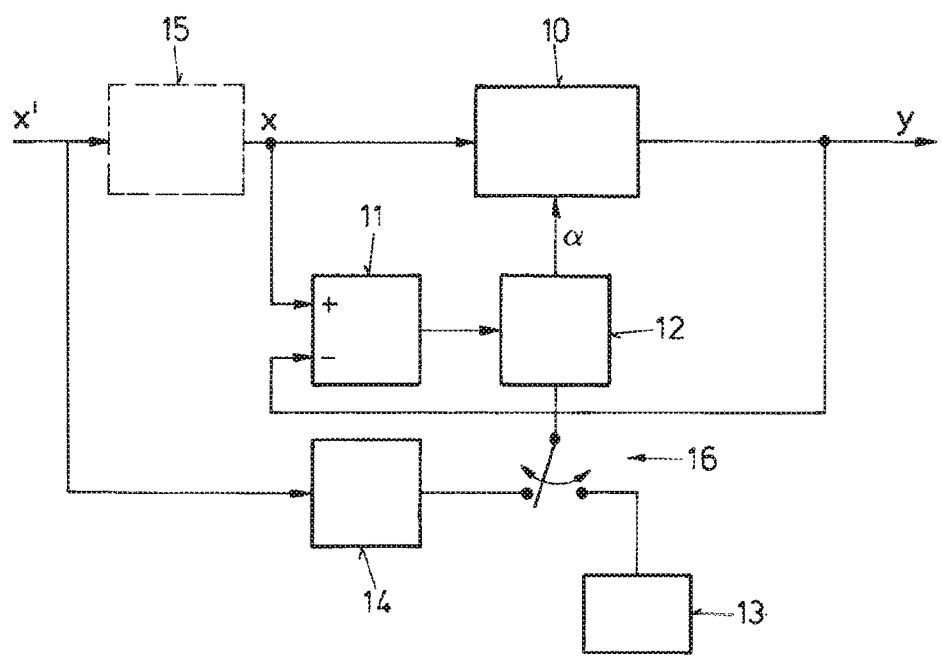
FIG. 3 shows a block diagram of a second embodiment of a filter unit in accordance with the invention.

FIG. 3 shows schematically and in a simplified view a block diagram with further embodiments of the present invention, wherein an estimation unit 14 and a switching unit 16 are additionally provided in contrast to the embodiment according to FIG. 2. Furthermore, a pre-filter unit 15 is additionally provided in a further embodiment.

The measurement signal x is supplied to the estimation unit 14 in the embodiment without the pre-filter unit 15, with which a level of the noise signal optionally present in the measurement signal x is determined. This level is used as a threshold value within the terms of the statements made in connection with the embodiment according to FIG. 2, or the threshold value is determined as a function of the specific level. This accordingly concerns an adaptive adjustment of the threshold value which is used as the basis for changing the filter characteristic of the filter unit 10. It can also be considered, as shown in the block diagram shown in FIG. 3, that the switching unit 16 allows changing over between a predetermined threshold value 13, which has been determined in advance or during a predetermined phase by the estimation unit 14, and the current level of the estimation unit 14. It can thus be provided for example that a fixing of the threshold value to a predetermined value is useful when the measurement signal changes as a result of frequent changes in pressure. It is obviously difficult in such a phase to distinguish between the useful signal component and the noise signal components in the measurement signal x. It is thus advantageous in pressure fluctuations to fall back on threshold values which were determined during quieter periods. New determinations of threshold values are all useful again once the measured pressure is stable again.

It is prevented in the embodiment with the pre-filter unit 15 (shown with the dashed lines) that so-called outliers in the measurement signal x are considered by the filter unit 10, but especially by the comparator unit 11 and the decision unit 12. It was recognised that a median filter is especially suitable as a pre-filter unit 15, wherein a window value of three values is especially suitable in measurement cell arrangements of the type mentioned above.

The measurement signal x' can be used before the processing by the pre-filter unit 15 (as shown in FIG. 3) in the embodiment with the pre-filter unit 15 and the estimation unit 14 for the adaptive determination of the threshold value. It can also be considered alternatively to use the measurement signal x after the processing by the pre-filter unit 15 for the adaptive determination of the threshold value.

A filter in the filter unit 10 low-pass properties of the first order was assumed in the statements made in connection with the embodiments of the present invention shown in FIGS. 2 and 3. Express notice must be taken that higher orders can also be considered for the filter of the filter unit 10. That is why the statements made in connection with the filter of the filter unit 10, especially the statements concerning the time constant and the thus related changes, must also be regarded within the terms of a first approximation. The behaviour of the present invention does not change fundamentally when filters of a higher order are used.

Express notice must be taken that the described method, although described in connection with a membrane pressure cell, can be used exceptionally well in pressure measurement cells of any configuration. Pressure measurement cells with a membrane, as discussed in the introduction to description, are consequently only one possible design of many.

The invention claimed is:

1. A method for processing a measurement signal (x; x') of a pressure measurement cell (2) for producing an output signal (y) by means of a filter unit (10), wherein the method is provided in that
the output signal (y) is generated by means of a filter unit (10) in that a noise signal contained in the measurement signal (x; x') is at least reduced, preferably eliminated,
a difference between the measurement signal (x; x') and the output signal (y) is determined continuously, and
a characteristic of the filter unit (10) is changed once the difference becomes greater than a threshold value, wherein the changed characteristic of the filter unit (10) remains for such a time until the difference becomes smaller than the threshold value,
wherein the change in the filter characteristic consists of a decrease in the reduction of the noise signal contained in the measurement signal (x; x'), characterized in that a level of the noise signal is determined and the threshold value is determined depending on the level of the noise signal.

2. A method according to claim 1, characterized in that the change in the filter characteristic consists of the measurement signal (x; x') becoming the output signal (y) without any change.

3. A method according to claim 1, wherein the threshold value is determined in advance based on a prior use of the pressure measurement cell (2), and the threshold value remains fixed during the operation of the pressure measurement cell (2).

4. A method according to claim 1, characterized in that the measurement signal (x; x') is converted by an analog-to-digital converter into a time-discrete measurement signal $x_n$, and the filter unit (10) has a low-pass characteristic for reducing the noise signal, which is defined in a first approximation by a low-pass filter of the first order with a time constant $$\tau = \Delta T \cdot \frac{1-\alpha}{\alpha},$$

wherein ΔT corresponds to the scanning interval in a time-discrete system and α is a variable whose value lies between 0.0 and 0.1, preferably between 0.0 and 0.01, for a reduction of the noise signal in the measurement signal (x; x'), and the value of the variable α lies between 0.3 and 1.0 for the changed characteristic of the filter unit (10).

5. A method according to claim 4, characterized in that the output signal $y_n$ is determined according to the formula $$Y_n = \alpha \cdot x_n + (1-\alpha) \cdot Y_{n-1}$$

for the reduction of the noise signal in the measurement signal $x_n$, wherein y is the time-discrete output signal, x is the time-discrete measurement signal and n a time-dependent index.

6. A method according to claim 4, characterized in that the variable α receives the value 1.0 if the difference between the measurement signal (x; x') and the output signal (y) is greater than the threshold value.

7. A method according to claim 4, characterized in that a median filter (15) is applied to the measurement signal (x') before it is processed in the filter unit (10), wherein the median filter (15) preferably has a window width of three values.

8. A measurement cell arrangement, comprising a membrane pressure measurement cell (2) which generates a pressure-dependent measurement signal (x; x'), which is supplied to a filter unit (10) for generating an output signal (y), characterized in that means (11) are present for the continuous formation of a difference between the measurement signal (x; x') and the output signal (y), and means (12) are present for changing an original characteristic of the filter unit (10), wherein the changed characteristic of the filter unit (10) is maintained for as long as the difference is greater than a threshold value, wherein the changed filter characteristic reduces a noise signal present in the measurement signal (x; x') to a lesser extent than the original filter characteristic, characterized in that means (14) are present for determining a level of the noise signal, and the threshold value can be determined depending on the level of the noise signal.

9. A measurement cell arrangement according to claim 8, characterized in that the output signal (y) corresponds to the measurement signal (x) with changed filter characteristic.

10. A measurement cell arrangement according to claim 8, wherein the threshold value is determined in advance based on a prior use of the used pressure measurement cell (2) and remains fixed during the operation of the pressure measurement cell (2).

11. A measurement cell arrangement according to claim 8, characterized in that the measurement signal (x; x') is supplied to an analog-to-digital converter for generating a time-discrete measurement signal $x_n$, and the filter unit (10) has a low-pass characteristic for reducing the noise signal, which is defined in a first approximation by a low-pass filter of the first order with a time constant $$\tau = \Delta T \cdot \frac{1-\alpha}{\alpha},$$

wherein ΔT corresponds to the scanning interval in a time-discrete system and α is a variable whose value lies between 0.0 and 0.1, preferably between 0.0 and 0.01, for a reduction of the noise signal in the measurement signal, and the value of the variable α lies between 0.3 and 1.0 for the changed characteristic of the filter unit (10).

12. A measurement cell arrangement according to claim 11, characterized in that the output signal $y_n$, is determined according to the formula $$y_n = \alpha \cdot x_n + (1-\alpha) \cdot y_{n-1}$$

for the reduction of the noise signal in the measurement signal $x_n$, wherein y is the time-discrete output signal, x is the time-discrete measurement signal and n a time-dependent index.

13. A measurement cell arrangement according to claim 11, characterized in that the variable a receives the value 1.0 if the difference between the measurement signal (x) and the output signal (y) is greater than the threshold value.

14. A measurement cell arrangement according to claim 11, characterized in that a median filter (15) is provided, to which the measurement signal (x') is supplied, wherein the median filter (15) is operatively connected to the filter unit (10) and wherein the median filter (15) preferably has a window width of three values.

\* \* \* \* \*